United States Patent
Reabe

(10) Patent No.: US 8,450,998 B2
(45) Date of Patent: May 28, 2013

(54) DIGITAL QUANTITY GAUGE FOR AN AGRICULTURAL AIRCRAFT PAYLOAD HOPPER USING A MAGNETOSTRICTIVE LINEAR DISPLACEMENT TRANSDUCER (MLDT)

(76) Inventor: Troy Robert Reabe, Howards Grove, WI (US)

( * ) Notice: Subject to any disclaimer, the term of this patent is extended or adjusted under 35 U.S.C. 154(b) by 380 days.

(21) Appl. No.: 12/949,756

(22) Filed: Nov. 18, 2010

(65) Prior Publication Data
US 2011/0115478 A1 May 19, 2011

Related U.S. Application Data

(60) Provisional application No. 61/262,612, filed on Nov. 19, 2009.

(51) Int. Cl.
*G01B 7/14* (2006.01)
(52) U.S. Cl.
USPC ............. 324/207.24; 324/200; 324/207.21; 73/307; 73/314; 73/290 R
(58) Field of Classification Search
None
See application file for complete search history.

(56) References Cited

U.S. PATENT DOCUMENTS 6,125,697 A * 10/2000 Holton et al. .................. 73/309
7,528,606 B1 * 5/2009 In et al. ........................ 324/326

* cited by examiner

*Primary Examiner* — Jermele M Hollington
*Assistant Examiner* — Trung Nguyen
(74) *Attorney, Agent, or Firm* — Oakwood Law Group, LLP; Jie Tan

(57) ABSTRACT

A system for determining the quantity of a liquid agricultural product available for spraying on a field from a tank in an airplane comprising a payload storage tank for holding the agricultural product, an elongated magnetostrictive linear displacement transducer tube located vertically in the aircraft payload storage tank, a probe float slidably coupled to move up or down on the elongated magnetostrictive linear displacement transducer tube, and a permanent magnet coupled to the probe float. The position of the magnet is sensed by the elongated magnetostrictive linear displacement transducer tube which generates a signal that marks the level of the liquid in the aircraft payload storage tank, and converter means converts the generated signal that marks the level of the liquid in the aircraft payload storage tank to a quantity of liquid in the aircraft payload storage tank which is displayed to the pilot.

20 Claims, 1 Drawing Sheet

DIGITAL QUANTITY GAUGE FOR AN AGRICULTURAL AIRCRAFT PAYLOAD HOPPER USING A MAGNETOSTRICTIVE LINEAR DISPLACEMENT TRANSDUCER (MLDT)

REFERENCE TO RELATED APPLICATIONS

This patent application claims the benefit of U.S. Provisional Application No. 61/262,612 filed on Nov. 19, 2009, the disclosure of which is incorporated herein by reference in its entirety.

BACKGROUND OF THE INVENTION

1. Field of the Invention

The present invention relates to a method and system for determining the quantity of liquid product that remains in an airplanes hopper by measuring the liquid volume of an liquid agricultural product in an aircraft pay load hopper.

2. Background of the Invention

Hopper tanks for holding liquid agricultural product which is to be dispensed over a farm by a small airplane can have irregular shapes and sizes. This can result in the fact that the indication of the level of the agricultural product in the hopper tank, typically provided by a sensor of one of the various known types, can not easily be converted into a reliable indication of the quantity or volume of the agricultural product that is available for spraying. Unreliable information that relates to the quantity of liquid agricultural product that is present in the small airplane payload hopper can have a negative effect on the loading, balancing and operation of the airplane when taking off, during flight and on landing.

Systems for indicating liquid agricultural product level currently in use include mechanical, electromechanical or electronic "damping" means which makes it possible to attenuate the oscillations of the indication provided to the use upon variation in the level of the liquid agricultural product in the airplanes hopper tank due to swashing and in general, to oscillations in the level due to maneuvers or dynamic conditions involving rapid variations of the airplane such as turns, banks, accelerations, abrupt changes in altitude, etc. Such systems may measure rapid dynamic variations in the level of the liquid agriculture product in the hopper tank which does not relate to effective variations in the quantity or volume of agricultural product that is available in the tank for spraying.

Thus, there exists a need for a simple system for determining the quantity or volume of liquid agriculture product that is in an airplanes payload hopper that is available for spraying that is reliable.

SUMMARY OF THE INVENTION

In an exemplary embodiment of the present invention, there is disclosed a system for determining the quantity of a liquid agricultural product available for spraying on a field from a tank in an airplane comprising a payload storage tank for holding the agricultural product, an elongated magnetostrictive linear displacement transducer tube located vertically in the aircraft payload storage tank, a probe float slidably coupled to move up or down on the elongated magnetostrictive linear displacement transducer tube, and a permanent magnet coupled to the probe float. The position of the magnet is sensed by the elongated magnetostrictive linear displacement transducer tube which generates a signal that marks the level of the liquid in the aircraft payload storage tank, and converter means converts the generated signal that marks the level of the liquid in the aircraft payload storage tank to a quantity of liquid in the aircraft payload storage tank which is displayed to the pilot.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
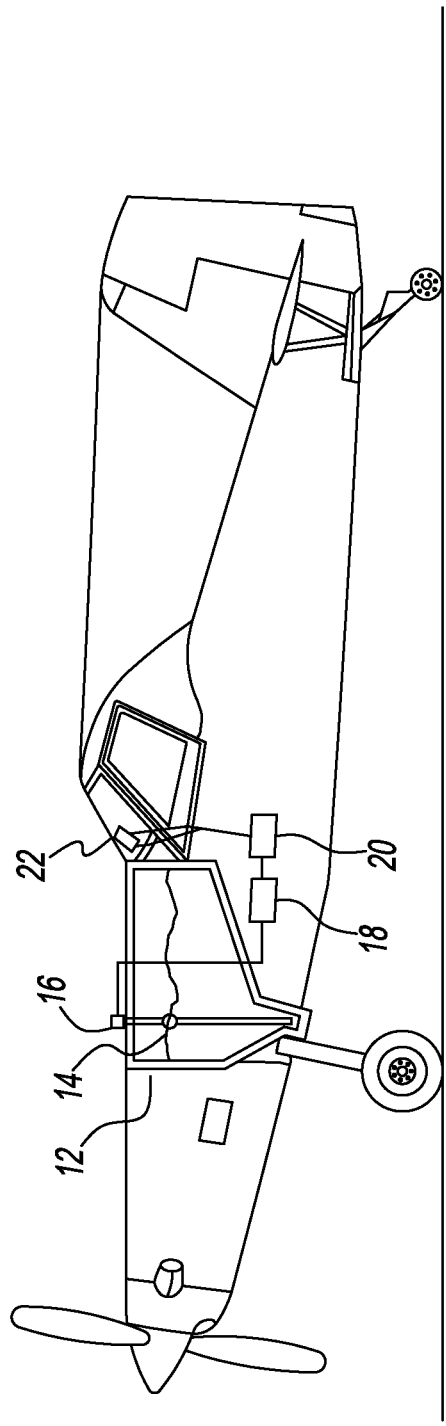
FIG. 1 is a side view of a small crop duster airplane with an irregular shaped payload hopper having a magnetostrictive linear displacement transducer for determining the volume of a liquid agricultural product located in the irregular shaped payload hopper that is displayed on a digital quantity gauge in accordance with the principles of the invention.

Referring to FIG. 1, there is disclosed a side view of a small crop duster airplane with an irregular shaped payload hopper having a Magnetostrictive Linear Displacement Transducer (MLDT) for determining the volume of a liquid agricultural product located in the irregular shaped payload hopper that is displayed on a digital quantity gauge in accordance with the principles of the invention.

The present invention is a quantity system and method that uses an MLDT to determine the liquid volume in the payload hopper of an airplane. The MLDT transmits the height reading of the liquid to a converter/display located in the cockpit.

The converter/display filters the signal, thereby removing the sloshing in the signal, and converts the filtered height to a volume that appears on a digital display.

The MLDT possesses a single physical wear point, the float. Utilizing this mostly solid state electronic system increases the total reliability of the system. The MLDT system has an additional advantage in that there is no mechanical limitation to the resolution that the MLDT can give. Taking advantage of the higher resolution and combining this with a calibrated filter and signal converter allows the precise quantity of liquid product in the payload hopper to be digitally displayed on a gauge.

The device is comprised of the following:

An agricultural aircraft payload hopper 12 which contains a liquid agriculture product.

A probe float 14 which floats on the surface of the liquid agriculture product in a payload tank in the airplane that may be square, round, rectangular, irregular, etc.

A Magnetostrictive Linear Displacement Transducer (MLDT) tubular member 16 that senses the height of the probe float.

Filtering electronics 18 which receives a signal from the magnetostrictive linear displacement transducer and smooths out the height signal.

Converter electronics 20 which receives the filtered height signal of the liquid in the irregular tank from the filtering electronics 18 of the liquid in the irregular tank and converts it to a tank quantity.

A readout display 22 which is coupled to receive the signal from the converting electronics to show the quantity of liquid product in the irregular tank The agricultural aircraft payload hopper 12 is a storage tank mounted internally or externally on an agricultural aircraft which holds the liquid product that is to be sprayed on a field or farm from the air. The agricultural aircraft payload hopper 12 can be made of metal, plastic, or fiberglass and the shape may be a simple geometric shape, but more commonly has a complex shape with a drafted bottom.

The probe float 14 consists of a buoyant member such as wood, Styrofoam, or a sealed metal member which is less dense than the liquid in the tank being measured so that it can mark the position or height of the liquid in the tank. The float contains a permanent magnet whose position is sensed by the MLDT 16.

The Magnetostrictive Linear Displacement Transducer (MLDT) 16 is a distance measuring device. It uses magnetostrictive technology to sense the distance the permanent magnet in the float is away from the head or end of the MLDT.

The filtering electronics 18, a circuit which is known by one having ordinary skill in the art, is an electrical circuit that is used to smooth the signal from the MLDT sensor. For example, to filter an analog signal a resistor capacitor circuit, an inductor capacitor circuit, a single capacitor or any other filter known in the art may be used. Filtering a digital signal is typically done using a program which is known by one having ordinary skill in the art. For example, this may be by averaging the digital readings over a set period of time or using a statistical analysis to remove the highs and lows to smooth out the signal, or any other currently used digital signal filtering.

In an embodiment the filtering electronics 18, converter electronics 20, and digital display, which are shown as separate components may be combined in a single microprocessor which would simplify the electronic lay out.

In an embodiment of the present invention, on takeoff the reading of the quantity of fluid in the agricultural aircraft payload hopper tank is automatically switched from ground attitude to level-flight attitude. This change automatically changes the scale of the signal from the converting electronics to account for pitch attitude changes of the airplane. In operation the engine gauges are used to determine if power is being produced. When the airplane is on the ground and the engine is at idle, the quantity gauge is in its ground mode. As soon as the throttle is moved to demand power the engine torque gauge show this change. The quantity gauge detects this change in the engine torque gauge and goes to level flight mode. It is understood that other indicators can be used to indicate that the airplane is in flight mode such as checking if the prop knob is in feather, checking the airspeed indicator and selecting flight mode based on the airplanes speed.

Ground mode and level flight mode are not just different tables to convert float height to quantity. The mode also selects the filter that is to be used. In flight there is more movement of the airplane and the chemical is dispensed at a slower rate. Therefore, a larger filter may be needed or wanted. In ground mode the airplane is normally stationary while it is being loaded and the load is put in the airplane at a fast rate so a smaller filter may be needed or desired for a faster response.

In another embodiment the brightness of the display in the cockpit is adjustable. This can be done using a dimmer, such as a rheostat or a push button switch to select two or more different levels of brightness, or any other adjustment method known in the art.

In another embodiment a second display may be mounted in a location for an aircraft loader to see.

Figure 2:
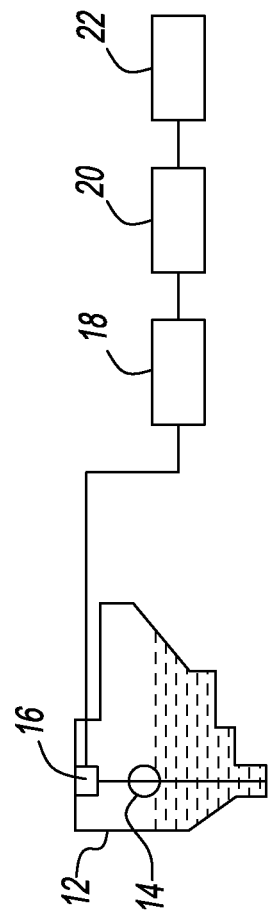
FIG. 2, is a block diagram of the present invention.

Referring to FIG. 2, there is shown a block diagram of the present invention. The embodiment shown in the drawing includes a single agricultural aircraft payload hopper tank 12 with an MLDT 16 mounted within the tank. Depending upon the fluid level in the agricultural aircraft payload hopper tank 12, the probe float 14 which contains a permanent magnet whose position is sensed by the MLDT moves up or down along the MLDT 16. The Signal from the MLDT 16 is sent through filtering electronics 18 to converting electronics 20 and then to the digital readout display 22.

In an embodiment the signal may be first sent to the converting electronics 20 and then to the filtering electronics 18.

The filtering electronics 18, converting electronics 20, and digital readout display 22 may be placed in individual boxes and located throughout the aircraft. The most space saving variation for the cockpit area would be to mount only the digital readout display 22 in the cockpit, with the converting electronics 20 and filtering electronics 18 elsewhere in the aircraft.

In operation, the probe float 14 is on the surface of the liquid in the agricultural aircraft payload hopper tank 12. The MLDT 16 sends a signal of the height of the probe float 14 through conducting wires to the filtering means 18 and the converting means 20 where the signal is processed and then to the display means 22 which shows the quantity of fluid in the tank.

The Filtering electronics 18 smoothes out the sloshing of the liquid in the agricultural aircraft payload hopper tank 12 so that the digital readout display 22 shows a stable quantity. The converting means 20 converts the height of the probe float 14 in the agricultural aircraft payload hopper tank 12 to the quantity of liquid in the agricultural aircraft payload hopper tank 12.

In an embodiment of the present invention the output of the magnetostrictive linear displacement transducer 16 can be an analog output of the level of fluid in an agricultural aircraft payload hopper tank 12 where the analog output of the MLDT 16 is fed to the filtering electronics 18 which can be a ten micro farad capacitor located across the analog inputs. The signal across the capacitor is converted with a map function which scales the analog input signal to a quantity of fluid in the tank which can be used to control a seven segment LCD display. In an embodiment of the invention the analog signal can be fed to a multi-meter to display the readings.

Prior art systems utilize either: A) A full mechanical system that use a float connected thru additional linkages to a mechanical gauge which is prone to linkage wear which results in backlash and resolution loss, B) An electrical system such as a resistive potentiometer, rotary encoder, or reed switch, which has electrical contact wear points, which limit the reliability of the gauge and the resolution that can be displayed.

In the present invention there are no moving parts aside from the probe float which increases the reliability of the system in the physically rugged environment of agricultural aircraft. In addition, the present invention has a 0.001 inches resolution capability which is far superior to the current agriculture aircraft industry systems, such as the reed switch system that has a resolution of 0.375 inches. This gain in resolution allows for increased precision of the display.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A system for determining the quantity of a liquid agricultural product available for spraying on a field from a tank in an airplane comprising:
    a payload storage tank for holding the agricultural product;
    an elongated magnetostrictive linear displacement transducer tube located vertically in the aircraft payload storage tank;
    a probe float slidably coupled to move up or down on the elongated magnetostrictive linear displacement transducer tube;
    a permanent magnet coupled to the probe float wherein the position of the magnet is sensed by the elongated magnetostrictive linear displacement transducer tube which generates a signal that marks the level of the liquid in the aircraft payload storage tank; and
    converter means coupled to convert the generated signal that marks the level of the liquid in the aircraft payload storage tank to a quantity of liquid in the aircraft payload storage tank.

2. The system as recited in claim 1 wherein the elongated magnetostrictive linear displacement transducer senses the distance that the permanent magnet is displaced from an end of the tube.

3. The system as recited in claim 1 further comprising: a display coupled to the converter means for displaying the quantity of liquid in the aircraft payload storage tank.

4. The system of claim 3 wherein the display of quantity of liquid in the aircraft payload storage tank is shown in ground mode when the airplane is on the ground and the engine is at idle or automatically switches to level flight mode when an engine gauge shows production of power, the propeller is not in feather or the airspeed indicator is above a predetermined level.

5. The system as recited in claim 4 further comprising a filter to smooth the signal from the elongated magnetostrictive linear displacement transducer.

6. The system of claim 5 wherein the filter in ground mode is smaller than the filter in level flight mode.

7. The system of claim 6 wherein the filter size is automatically switched to the smaller size as the airplane starts ground mode.

8. The system as recited in claim 5 wherein, when the signal is analog, a resistor-capacitor circuit, an inductor-capacitor or a capacitor is used as a filter.

9. The system as recited in claim 5 wherein, when the signal is digital, filtering is performed by averaging the digital readings over a set period of time or using a statistical analysis to remove the highs and lows.

10. The system as recited in claim 1 wherein the storage tank is mounted internally or externally on the aircraft.

11. The system as recited in claim 1 wherein the storage tank is made of metal, plastic or fiberglass.

12. The system as recited in claim 1 wherein the storage tank has a shape that is square, round, rectangular or of a complex configuration with a drafted bottom.

13. The system as recited in claim 1 wherein the probe float is made of wood, Styrofoam or a sealed metal member.

14. The system as recited in claim 1 wherein the display is located within the cockpit of the airplane.

15. The system as recited in claim 14 wherein a second display is located outside of the cockpit.

16. A method for determining the quantity of a liquid agricultural product available for spraying on a field from a tank in an airplane comprises:

providing a payload storage tank for holding the agricultural product;

locating an elongated magnetostrictive linear displacement transducer tube vertically in the aircraft payload storage tank;

slidably coupling a probe float to move up or down on the elongated magnetostrictive linear displacement transducer tube;

coupling a permanent magnet to the probe float wherein the position of the magnet is sensed by the elongated magnetostrictive linear displacement transducer tube which generates a signal that marks the level of the liquid in the aircraft payload storage tank; and providing converter means to convert the generated signal that marks the level of the liquid in the aircraft payload storage tank to a quantity of liquid in the aircraft payload storage tank.

17. The method as recited in claim 16 wherein the elongated magnetostrictive linear displacement transducer senses the distance that the permanent magnet is displaced from an end of the tube.

18. The method as recited in claim 16 further comprising: a display coupled to the converter means for displaying the quantity of liquid in the aircraft payload storage tank.

19. The method as recited in claim 18 wherein the display of quantity of liquid in the aircraft payload storage tank is shown in ground mode when the airplane is on the ground and the engine is at idle and automatically switches to level flight mode when an engine gauge shows production of power, the propeller is not in feather or the airspeed indicator is above a predetermined level.

20. The method as recited in claim 19 wherein the filter in ground mode is smaller than the filter in level flight mode.

\* \* \* \* \*